Jan. 20, 1970  KENZO OKABE  3,490,311
FRICTION-DRIVE, SPEED-REDUCING MECHANISM
Filed Nov. 9, 1967  2 Sheets-Sheet 1

INVENTOR.
BY K. Okabe

# United States Patent Office 3,490,311
Patented Jan. 20, 1970

3,490,311
FRICTION-DRIVE SPEED-REDUCING MECHANISM
Kenzo Okabe, Nagoya-shi, Japan, assignor to Asahi Seiki Kogyo Kabushiki Kaisha, Aichi-ken, Japan, a joint-stock company of Japan
Filed Nov. 9, 1967, Ser. No. 681,659
Claims priority, application Japan, Nov. 19, 1966, 41/106,811; Feb. 4, 1967, Ser. No. 42/9,381
Int. Cl. F16h *37/06, 15/18, 13/06*
U.S. Cl. 74—705          5 Claims

ABSTRACT OF THE DISCLOSURE

A pair of friction-drive planetary systems, each comprising a conical sun roller, a group of conical planet rollers arranged around and engaged with the sun roller, and a rotating ring engaged with the planet rollers, are coaxially fixed in opposed positions to an intermediate shaft transmit power at reduced speed to an output shaft from an input shaft. Both pressure devices provide torque-dependent pressure for positive contact between the rolling contact surfaces, and the resulting thrust is resisted by the intermediate shaft and not by the casing. At least one safety device is installed to prevent damage to the mechanism parts due to excessive load on the output shaft.

---

Figure 1:
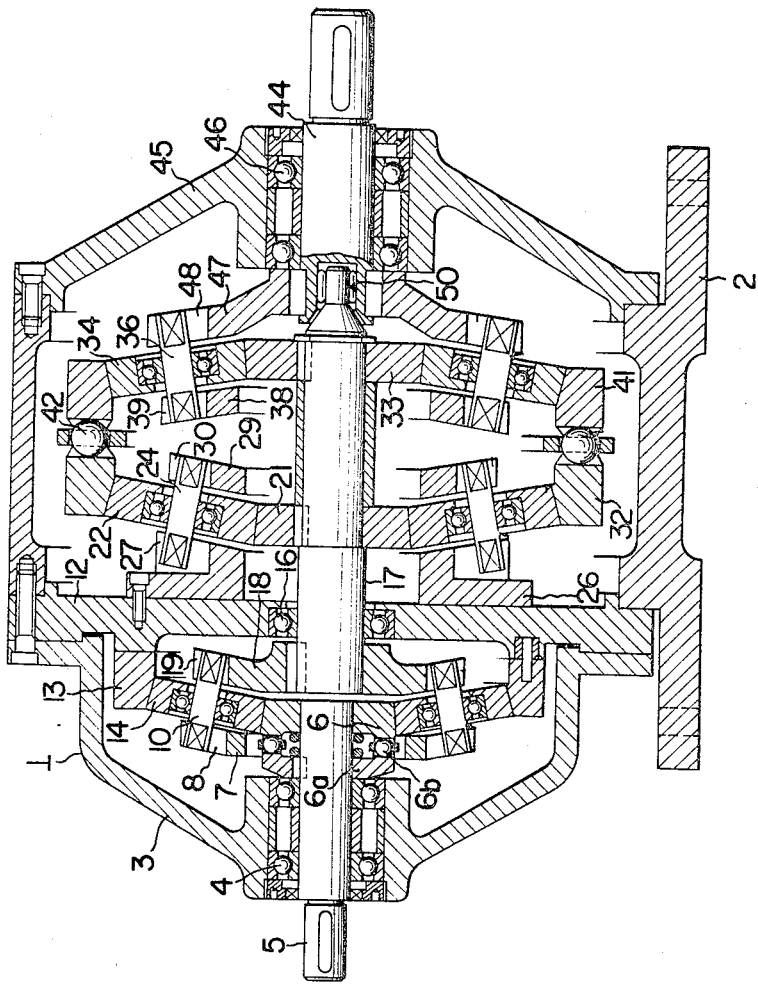

This invention relates to friction-drive, speed-reducing devices and more particularly to a new and improved friction-drive, speed-reducing device which is capable of operating silently, without vibration, and with high efficiency without the use of gears and has high durability for withstanding use over a long period of time, because the contact pressure in proportion to torque is applied to the contact point by the pressure device.

In general, in planetary speed-reducing mechanisms known heretofore, gears are used for the sun wheel, planet wheels, and outer ring in each case. Accordingly, gear cutting work has been necessary to produce these gears. Moreover, since these gears give rise to noise and vibration during operation, the casing of the main body of the speed-reducing mechanism has been subject to vibration, and because of wear of the gears, these mechanisms have lacked durability for long periods of use.

Furthermore, there has been the possibility of damage due to increase in the load and to impact load during starting.

In order to overcome these difficulties, speed-reducing mechanisms in which friction cone rollers are used have been proposed or built. When such friction cone rollers are used, however, it is necessary to apply considerable contact pressure to the contact surface of a cone roller. There are various methods for accomplishing the above purpose and one is the method for obtaining the necessary thrust by the constant force of a spring and another being the use of a press fit after an interference fit has been given to the contact surface at the time of assembly. According to these methods, since the contact pressure corresponding to the maximum transmission power is always applied to the contact surface, there develops a power loss due to the excessive contact pressure under the normal load or the less load thereby causing a lowering of durability.

It is an object of the present invention to overcome the above stated disadvantages. That is, instead of applying a predetermined contact pressure to the contact surface, the necessary and minimum contact pressure is automatically applied to the contact surface by using the pressure device in the necessary location whereby it is possible to maintain the power loss to a minimum and also extend the durability.

Moreover, the mechanism in which the conical rollers of friction type are employed necessitates a considerable thrust in order to apply the aforementioned pressure, but the reaction of the thrust reacts on the casing so that the casing necessitates great mechanical strength and accordingly becomes massive and expensive.

More specifically, an object of the invention is to provide a friction-drive, speed-reducing mechanism in which the thrust applied by a pressure device is received and countered by a single shaft, whereby no thrust force is applied to the casing.

Another object of the invention is to provide a speed-reducing mechanism of the above stated character in which since the sun cone roller, planetary roller and ring are respectively formed so that extension of the respective contact surfaces may intersect at a point on the axial line of the input shaft, these contact surfaces are in the line-contact condition and thus each member makes the pure rolling without spin and hence has silent and vibrationless operation of high efficiency, a relatively simple and inexpensive organization, and is durable.

A further object of the invention is to provide, in a speed-reducing mechanism of the above stated character, at least one safety device for preventing slippage between rolling parts and damage to parts due to abnormally excessive or impact torque arising from the imposition of excessive load on the output shaft.

In general, there are three types of driving mechanisms such as a conventional train, a planetary system and a differential system. The speed reduction ratio of the same becomes larger in the order of the conventional train, planetary system and differential system but the efficiency thereof is worsened in the order of the same.

Therefore, in case of obtaining the desired speed reduction ratio by one step, it is forcibly required to use a differential system and hance the lowering of efficiency is unavoidable, it is also one of the objects of the present invention to eliminate the above mentioned disadvantage and more particularly the object is to provide the friction drive speed reduction mechanism in which there are a main speed reduction device and a secondary speed reduction device in the main speed reduction device, torque is increased by using the differential system and in the secondary speed reduction device the system of a good efficiency is used thereby for obtaining collectively a large speed reduction ratio and also having a high efficiency.

According to the present invention, briefly summarised, there is provided a friction-drive, speed-reducing mechanism having a casing and input and output shafts and characterised by a planetary system which comprises sun cone rollers connected to an input shaft through a pressure device for imparting contact pressure, an outer ring fixed coaxially with the sun cone rollers to a casing, a number of planet cone rollers which are inserted between the sun cone rollers and the outer ring and arranged at equal distances along a circle so as to be frictionally engaged with the outer ring and the sun cone rollers and carriers supporting the planet cone rollers at equal distances along the circle and connecting the planet cone carriers with an intermediate shaft coupled to the input shaft, a pair of sun cone rollers fixed coaxially in opposed positions to the intermediate shaft, two groups of circularly arranged planet cone rollers respectively engage with the two sun cone rollers, a pair of coaxial rotating rings respectively engaged with the outermost parts of the two groups of planet cone rollers, a pressure device interposed between the pair of rotating rings for imparting thrust thereto in opposite axial directions, a locking member normally held in a stationary state and supporting short shafts for rotatably supporting the planet cone rollers of one group, with the other group being coupled to the output shaft, and at least one safety device to prevent damage to the parts of the mechanism due to excessive load on the output shaft.

The nature, principle, details, and utility of the invention will be more clearly apparent from the following detailed description with respect to a preferred embodiment of the invention when read in conjunction with the accompanying drawings, in which like parts are designated by like reference numerals.

Figure 2A:
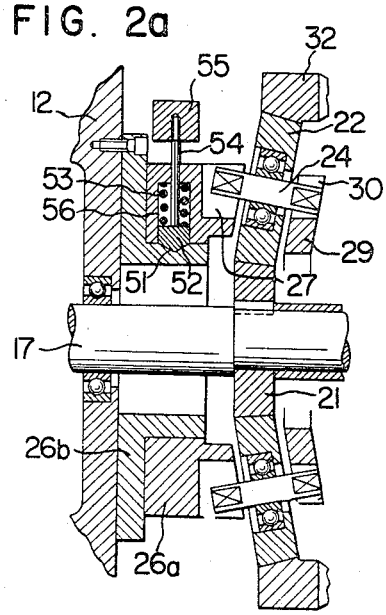
Figure 2B:
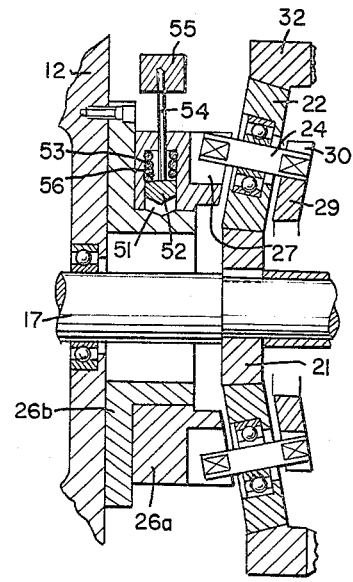
Figure 3A:
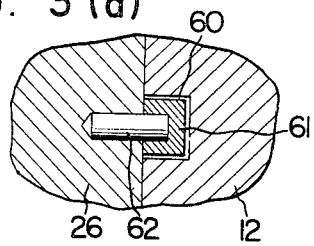
Figure 3B:
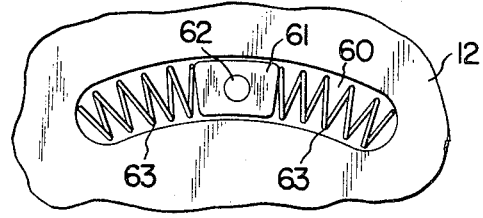

In the drawings:

FIG. 1 is a side elevational view, in vertical section, showing one example of a friction-drive planetary speed-reducing device embodying the invention;

FIGS. 2(a) and 2(b) are partial cross sectional views showing one example of a safety device according to the invention in latched and unlatched states, respectively; and FIGS. 3(a) and 3(b) are respectively a longitudinal sectional view and a view in the axial direction of the mechanism showing another example of a safety device according to the invention.

Referring to FIG. 1, the example of a friction-drive, planetary speed-reducing mechanism according to the invention shown therein is enclosed within a casing 1 fixedly mounted on a base 2. As viewed in FIG. 1, the motive power input side is on the left, and the power output side is on the right. The casing 1 has an input end cover 3 provided with a bearing 4 rotatably supporting a centrally alined input shaft 5 rotatably fitted at its inner end into a sun cone roller 6. Mutually facing annular surfaces of the sun cone roller 6 and a flange 6a fixed to the input shaft 5 have the configuration of corrugated cam surfaces and are mutually coupled by engagement balls 6b interposed therebetween for producing thrust when torque is transmitted. That is a sun cone roller 6, flange 6a and balls 6b constitute a pressure device.

A carrier 7 is provided around the pressure device and a number of radial slots 8 are arranged with equal circumferential space therebetween. A carrier 18 is arranged coaxially with the carrier 7 and is provided with a number of radial slots 19 as in the case of the carrier 7. The carriers 7 and 18 are formed integrally so that the respective radial slots may oppose each other, or, the carriers may be separately formed and rigidly fixed by means of stay bolts or the like (not shown). These opposed radial slots are respectively engaged with a short shaft 10 by one slidable in a radial direction.

On one hand, the casing 1 is provided therewithin with a stationary partition wall 12, to the input side of which is fixed a stationary outer ring 13 having an inner surface constituting an internal cone surface. This internal cone surface is engaged with planet cone rollers 14, supported on the aforementioned short shafts 10, and rollably engaged also with the surface of the sun cone roller 6.

The partition wall 12 is provided at its center with a bearing 16 rotatably supporting an intermediate shaft 17 at a part thereof near its end nearest the input side, with the shaft 17 being coaxially disposed relative to the input shaft 5. At the end of the shaft 17 toward the input side, the carrier 18 is fixed by means of a key.

A sun cone roller 21 is keyed to the intermediate shaft 17 at approximately the middle part thereof and is in pressure contact around its periphery with a plurality of planet cone rollers 22, which are rotatably supported on short shafts 24, as described hereinafter.

A plurality of radial slots 27 are provided, at equal distances along the same circle, on the locking member 26 which is fixed to the side surface of the partition wall 12 at a position confronting the outer ring 13. A plurality of radial slots 30 are provided in a wheel 29 which is coaxial with the locking member 26. The member 26 and the wheel 29 are defined as one body so that their radial slots are opposite each other, or such components may be separately formed and thereafter tightly secured by stay bolts (not shown).

In each space formed between opposed radial slots, a short shaft 24 is engaged so as to slide in a radial direction.

The planet cone rollers 22 are pressed at their peripheries against the inner cone surface of rotating ring 32.

Another sun cone roller 33 is keyed to the intermediate shaft 17 at a point thereof in the vicinity of its end nearer the output side. The diameter of this sun cone roller 33 is larger than that of the sun cone roller 21. The outer periphery of this cone roller 33 is in pressure contact with a plurality of planet cone rollers 34 rotatably supported on short shafts 36.

A carrier 38 is arranged coaxially with and faces the wheel 29 and is provided with a plurality of radial slots 39 located at equal distances along the same circle. A carrier 47 is coaxial with the carrier 38 and is formed with a plurality of radial slots 48 similar to the slots 39. The carriers 38 and 47 are fabricated as one body in order that their radial slots are opposite each other. The carriers may be separately made and secured together by stay bolts or the like (not illustrated). A short shaft 36 is engaged in each space located between opposed radial slots so as to slide in a radial direction.

The outer peripheries of the planet cone rollers 34 are pressed against the inner cone surface of a rotating ring 41 similar to and facing the rotating ring 32. The mutually facing annular surfaces of the rings 32 and 41 have the configuration of corrugated cam surfaces and are mutually coupled by engagement balls 42 interposed therebetween for generating axial thrust when torque is transmitted between the rings 32 and 41.

The diameter of the planet cone rollers 34 is smaller than that of the aforementioned planet cone rollers 22.

On the output side of the intermediate shaft 17 and coaxial therewith, there is disposed an output shaft 44 rotatably supported by a bearing 46 which is held in an output end cover 45 forming the cover of the output end of the casing 1. The extreme end of the intermediate shaft 17 on the output side is rotatably supported with a needle roller 50 in the recess of the inner end (input end) of this output shaft 44 to which the carrier 47 is keyed.

The extensions of the conical surfaces of all cone rollers and cone rings described above respectively converge to apices which lie on the axes of the rotating shafts.

The speed-reducing device of the above described organization according to the invention operates in the following manner. Rotation of input shaft 5 is transmitted by way of pressure device 6b to sun cone roller 6 and planet cone rollers 14. Consequently, planet cone rollers 14 rotate about their respective axes as they revolve with respect to the inner surface of outer ring 13, whereby short shafts 10 revolve to cause carrier 18 to rotate. Accordingly, intermediate shaft 17 rotates.

The rotation of intermediate shaft 17 is transmitted to sun cone rollers 21 and 33, with the rotation of sun cone roller 21 being transmitted to planet cone rollers 22. Then, since locking member 26 is fixed, planet cone rollers 22 rotate about their respective short shafts 24, and this rotation is transmitted to rotating ring 32. The rotation of rotating ring 32 is transmitted through ball 42 to the opposite rotating ring 41, with a thrust in opposite axial directions of shaft 17 being produced at the same time.

The difference in the rotations of sun cone roller 33 and ring 41 causes planet cone rollers 34 to revolve as they rotate about their respective short shafts 36. This revolution of planet cone rollers 34 is transmitted through short shafts 36 to carrier 47, whereby output shaft 44 rotates under reduced speed relative to input shaft 5.

The above mentioned thrust produced by balls 42 has components in opposite axial directions which are transmitted through rings 32, 41 and imparted to planet cone rollers 22 and 34 and sun cone rollers 21 and 33. Accordingly, the contacting parts of these cone rollers are caused to make positive contact, with the resulting reaction forces counter to the thrust components being provided by the intermediate shaft 17.

The speed-reducing device of the above described organization and operation according to the invention is provided with a safety device as described below with respect to two examples therof.

In one example, a fixed member 26b and a carrier 26a are used in place of the locking member 26. The fixed member 26b is fixed to the wall 12 and has a boss part on the outer periphery of which there are provided two or more notches 51 disposed with equal angular spacing. The carrier 26a is rotatably supported on the boss of the fixed member 26b and is provided with two or more radially directed slide slots 56 formed with equal angular spacing on its side facing the output end.

A click latch 52 slidably fitted in each of these slide slots 56 has at one end a conical tip adapted to engage with a corresponding notch 51 and is fixed at the other end to the inner end of a stem 54 supporting on its outer end a weight 55 for producing centrifugal force to be imparted to the click latch 52. A compression spring 53 is inserted in each slide slot 56 between its head and the click latch 52 to press the click latch constantly toward the boss of the fixed member 26b, whereby the conical tip of the click latch 52 in the normal state is pressed into and held in the corresponding notch 51.

Thus, in the normal state, the carrier 26a is latched to the fixed member 26b by the engagement of all latches 52 in their respective notches 51 and is thereby held stationary as illustrated in FIG. 2(a).

In the event that an overload due to a cause such as a malfunctioning of the driven machinery is imposed on the output shaft 44, the latches 52 are forced out of their respective notches 51 in the radial direction against the forces of springs 53, thereby causing disengagement of the latches and notches as shown in FIG. 2(b). Consequently, the carrier 26a begins to rotate, whereupon the centrifugal force acting on each weight 55 compresses the corresponding spring 53 and prevents the latch 52 from reentering a notch 51. In other words, the carrier 26a becomes free of the fixed member 26b. Consequently, power cannot be transmitted, and output rotation immediately stops.

In this manner, abnormally excessive stresses are prevented from being imposed on various parts of the mechanism. When the rotation stops, centrifugal force on each latch 52 is no longer applied, whereby the latch 52 is caused by its spring 53 to engage again with a notch 51, and the mechanism is thus returned to its original state.

In another example of a safety device according to the invention as illustrated in FIGS. 3(a) and 3(b), at least one arcuate groove 60 is formed in the partition wall 12 at a part thereof in contact with the outer ring 13, with the contact plane being perpendicular to the axis of the shaft 17. The outer ring 13 is supported in a rotatable manner relative to the wall 12 and holds a stud pin 62 partly imbedded therein and protruding toward the arcuate groove 60 to fit into a central hole in a slider block 61 slidably engaged within the arcuate groove 60. The curvature and direction of the arcuate groove 60 are such that the slider block 61 sliding therein follows the path of the movement of the stud pin 62 when the outer ring 13 rotates relative to the wall 12. Springs 63 are respectively fitted in the groove 60 between the two side surfaces of the slider block 61 and the corresponding ends of the groove 60.

When a shack load is imposed on the output shaft 44, the slider block 61 is caused to compress one of the springs 63 whereby the outer ring 13 rotates relative to the partition wall 12 against the force of that spring. Therefore, the shack load is absorbed, and the imposition of abnormally excessive stress on various parts of the speed reducer is prevented.

While the groove 60 is formed in the partition wall 12 in the above described example, it will be apparent that it is also possible to reverse the arrangement by forming the groove in the outer ring 13 and fixing the stud pin 62 to the wall 12. Furthermore, it is also possible to install both safety devices as described above in one speed-reducing mechanism of the invention.

In the speed-reducing mechanism of the above described organization and operation according to the invention, since the apices of the conical surfaces of all rollers and rings lie on the axis of the central shafts, the contacts between the rolling contact surfaces are all line contacts, thereby obtaining high efficiency.

Furthermore, since a necessary minimum contact pressure is automatically imparted to the contact surface by using a pressure device provided at the required portion, power loss is minimized thus increasing its life.

Furthermore, since no gears are used, the organization of the mechanism is relatively simple and inexpensive and affords high efficiency and silent operation. Another advantageous feature of the invention is that reaction force with respect to the thrust produced by the pressure device is provided entirely by the intermediate shaft, whereby the thrust is not imposed on the casing. Accordingly, the casing is not required to have high mechanical strength and, therefore, can be produced at low cost.

A further advantageous feature of the invention resides in the safety devices as described above which protect various parts of the mechanism from abnormally excessive stress due to application of overload or shock load to the output shaft.

What I claim is:

1. A friction-drive, speed-reduction mechanism: comprising a stationary frame; an input shaft; an intermediate shaft and an output shaft rectilinearly arranged in the stationary frames; a sun cone roller; a pressure device connecting the sun cone roller with the input shaft; an outer ring affixed to the frame; a plurality of planet cone rollers inserted between the sun cone roller and outer ring for being frictionally engaged with said roller and outer ring; coaxial carriers supporting the planet cone rollers at equal distances on a circle to be slidable in a radial direction; said carriers being keyed on the input side end of the intermediate shaft; a pair of sun cone rollers attached to about the central portion of the intermediate shaft; a pair of coaxial rotating rings arranged to be coaxial with said pair of sun cone rollers; a further pressure device connecting the rotating rings; two groups of circularly arranged planet cone rollers provided between the sun cone rollers and the rotating rings and frictionally engaged with the sun cone rollers and rotating rings; locking members supporting one of two groups of planet cone rollers at equal distances so as to be slidable in a radial direction; further carriers supporting the other of two groups of the planet cone rollers and arranged to be coaxial with the locking members; the locking members being affixed to the frame; and the further carriers being connected to the output shaft.

2. The friction-drive, speed-reducing mechanism as claimed in claim 1 in which a safety device is installed between a reaction member defined by the outer ring and a stationary part of the mechanism.

3. The friction-drive, speed-reducing mechanism as claimed in claim 2 in which the safety device is a click-latch device comprising, in combination: a fixed member fixed to a wall constituting the stationary part, said fixed member having a hub coaxially disposed relative to the intermediate shaft; a plurality of notches formed on the outer periphery of said hub with equal circumferential spacing; a carrier member disposed coaxially around and rotatably supported on said hub of the fixed member but normally latched thereto in a stationary state; slide slots of the same number as said notches formed in said carrier member with equal angular spacing; click latches each slidably fitted in a respective one of said slide slots and having at one end thereof a conical tip for engaging with one of the notches and at the other end a stem fixed at its inner end thereto; weights for producing centrifugal force, each fixed to the outer end of one stem; and springs each inserted in one slide slot to urge the click latch constantly toward the hub.

4. The friction-drive, speed-reducing mechanism as claimed in claim 2 in which the safety device is a shock absorbing device comprising, in combination: at least one arcuate groove formed in said stationary part in the direction of said rotation of the outer ring; a slider block slidably engaged within said arcuate groove and having a central hole; a stud pin imbedded at one end thereof in said outer ring and fitted at the other end into said central hole; and two springs respectively fitted in the arcuate groove between the slider block and the ends of the arcuate groove.

5. The friction-drive, speed-reducing mechanism as claimed in claim 2 in which the safety device consists of a click-latch device and a shock absorbing device, said click-latch device comprising, in combination:

a fixed member fixed to a wall constituting the stationary part, said fixed member having a hub coaxially disposed relative to the intermediate shaft;

a plurality of notches formed on the outer periphery of said hub with equal circumferential spacing;

a carrier member disposed coaxially around and rotatably supported on said hub of the fixed member but normally latched thereto in a stationary state;

slide slots of the same number as said notches formed in said carrier members with equal angular spacing;

click latches each slidably fitted in a respective one of said slide slots and having at one end thereof a conical tip for engaging with one of the notches and at the other end a stem fixed at its inner end thereof;

weights for producing centrifugal force each fixed to the outer end of one stem; and springs each inserted in one slide slot to urge the click latch constantly toward the hub;

and said shock absorbing device comprising, in combination:

at least one arcuate groove formed in said stationary part in the direction of rotation of the outer ring;

a slider block slidably engaged within said arcuate groove and having a central hole;

a stud pin imbedded at one end thereof in the outer ring and fitted at the other end into said central hole; and two springs respectively fitted in the arcuate groove between said slider block and the ends of the arcuate groove.

References Cited

UNITED STATES PATENTS

| 771,541 | 10/1904 | Ericson | 74—208 |
| 1,528,530 | 3/1925 | Coffee | 74—705 |
| 1,871,835 | 8/1932 | Batchelder | 74—705 |
| 3,207,004 | 9/1965 | Chery | 74—798 |

JAMES A. WONG, Primary Examiner

U.S. Cl. X.R.

74—202, 798